United States Patent
Parker et al.

(10) Patent No.: US 7,590,136 B1
(45) Date of Patent: Sep. 15, 2009

(54) SYSTEM AND METHOD FOR ROUTING TRAFFIC IN AN OPTICAL NETWORK

(75) Inventors: Craig Parker, Kanata (CA); Craig Suitor, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 619 days.

(21) Appl. No.: 10/962,044

(22) Filed: Oct. 8, 2004

Related U.S. Application Data

(60) Provisional application No. 60/510,047, filed on Oct. 9, 2003, provisional application No. 60/510,631, filed on Oct. 10, 2003.

(51) Int. Cl.
*H04L 12/28* (2006.01)
*H04L 12/56* (2006.01)

(52) U.S. Cl. ............................ 370/419; 370/359

(58) Field of Classification Search .................. 370/419
See application file for complete search history.

(56) References Cited

U.S. PATENT DOCUMENTS

| | | | |
|---|---|---|---|
| 6,724,728 B1 * | 4/2004 | Manchester et al. | 370/236.2 |
| 7,002,961 B1 * | 2/2006 | Lane et al. | 370/395.1 |
| 7,054,311 B2 * | 5/2006 | Norman et al. | 370/378 |
| 7,167,922 B2 * | 1/2007 | Narayanan | 709/242 |
| 7,245,619 B1 * | 7/2007 | Guan et al. | 370/392 |
| 2002/0051450 A1 * | 5/2002 | Ganesh et al. | 370/389 |

* cited by examiner

*Primary Examiner*—Gregory B Sefcheck
*Assistant Examiner*—Suk Jin Kang
(74) *Attorney, Agent, or Firm*—Guerin & Rodriguez, LLP; Michael A. Rodriguez

(57) ABSTRACT

A system and method for routing operations, administration, and maintenance traffic for an optical network are described. A subset of a routing information set is transmitted to tributary cards of a network element. The tributary cards route operations, administration, and management traffic based on the subset of the routing information.

20 Claims, 5 Drawing Sheets

SYSTEM AND METHOD FOR ROUTING TRAFFIC IN AN OPTICAL NETWORK

RELATED APPLICATIONS

This application claims the benefit of U.S. Provisional Patent Application No. 60/510,047 filed on Oct. 9, 2003, and of U.S. Provisional Patent Application No. 60/510,631 filed on Oct. 10, 2003, the entire contents of both provisional applications are incorporated herein by reference.

FIELD OF THE INVENTION

The invention relates to routing telecommunications traffic. More specifically, the invention relates to a method of routing operations, administrative, and management traffic in an optical network.

BACKGROUND OF THE INVENTION

With data rates increasing and network capacities on the rise, the amount of network traffic processed by a network element continues to increase. Along with processing payload traffic (i.e., data communications packets) the network elements are required to process operations, administration, and management (OAM) traffic. The network elements typically include a processor card for processing data and tributary cards for receiving and transmitting data. Generally, the tributary cards receive OAM traffic and transfer the OAM traffic to the shelf processor card of the network element for processing.

The shelf processor card maintains routing information for the optical network and accesses the routing information to determine the appropriate path for the OAM traffic. This form of centralized routing has served industry well; however, as the amount of OAM traffic continues to increase, an improvement in routing OAM packets is needed to reduce the OAM processing load of the shelf processor card. One solution is to increase the processing capabilities of the shelf processor card. However, this approach leads to increases in design and manufacturing costs of the network element.

SUMMARY OF THE INVENTION

In one aspect, the invention features a network element for use in an optical communication system. The network element includes a backplane that is in communication with a first card and a second card. The first card has a processor for executing instructions and a memory element for storing routing information. The second card has a memory element for storing a subset of the routing information of the first card and a processor element that is configured to access the subset of routing information and execute routing functionality when a packet received by the second card is destined for an address that is part of the subset.

In another aspect, the invention features an optical network element that has a backplane and a plurality of cards in communication with the backplane. Each card has a processor element for executing instructions and a memory element for storing routing information. A first card of the plurality stores routing information for each of the other cards and transmits to each of the other cards a portion of the routing information relevant to that other card. Each of the other cards routes packets through the network element based on the routing information received from the first card.

In another aspect, the invention features a method for routing a management packet in an optical communications system. The method includes generating a routing information set for use in a first card of an network element, forming a subset of the routing information set, and forwarding the subset through a backplane to a second card of the network element. The method also includes receiving the subset by the second card, storing the subset in a memory element, accessing the subset in response to receiving a packet having a destination address, and routing, by the second card, the packet to the destination address when the destination address is part of the subset.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention features a shelf processor card of a network element that distributes a subset of a master OAM routing information set to tributary cards of the network element. Instead of centralized routing (i.e., all OAM routing performed by the shelf processor card), as is traditionally done, each of the tributary cards is capable of providing routing functionality. This distributed routing configuration reduces the routing load placed on the shelf processor card.

Figure 1:
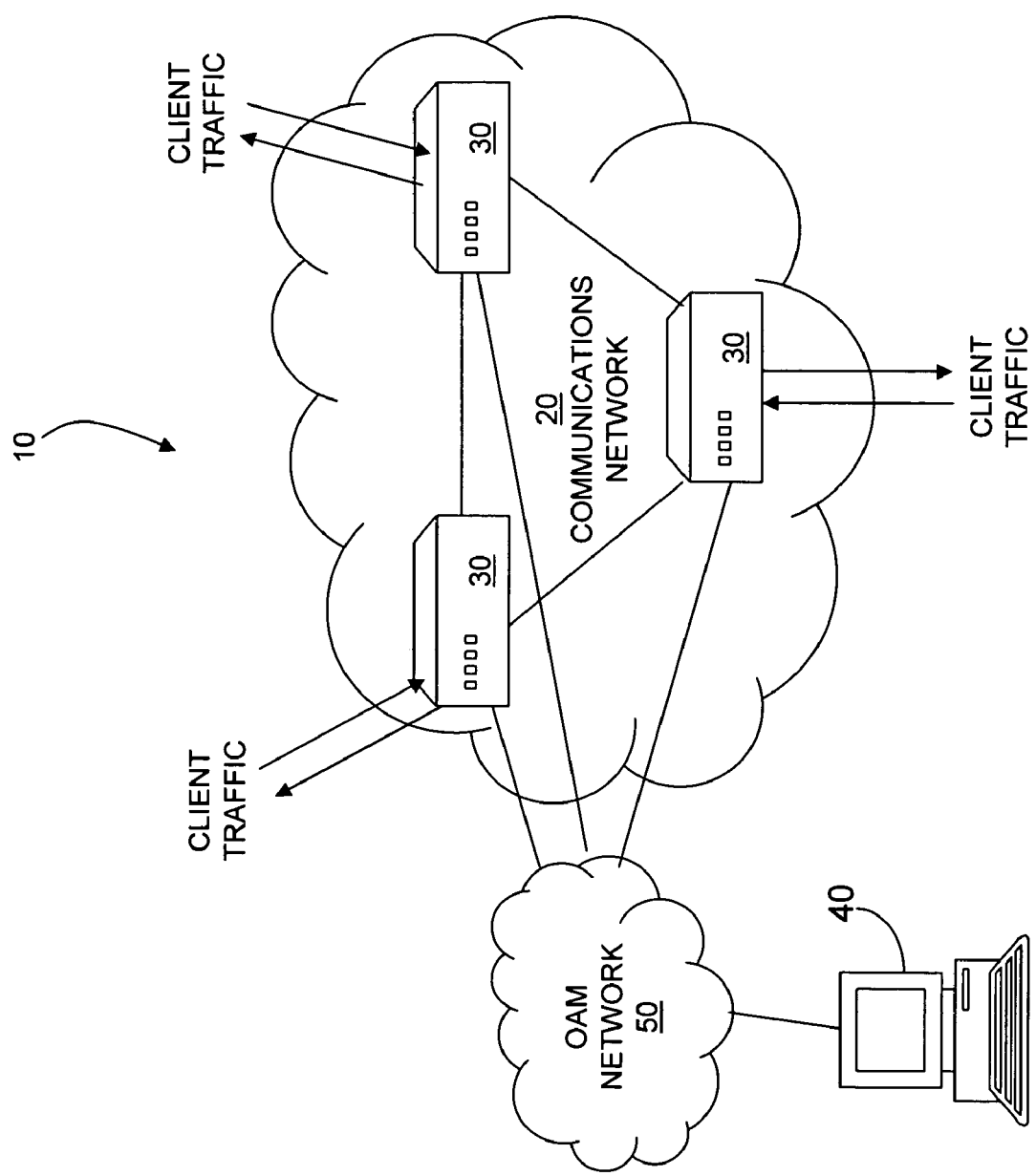
FIG. 1 is a representation of a telecommunications network in which an embodiment of the invention may be practiced.

FIG. 1 illustrates a telecommunications network 10 in which the invention can be practiced. The telecommunications network 10 includes a communications network 20 having a number of network elements 30 (only three shown for clarity), communication paths, and other network components (not shown). As shown, the network elements 30 can communicate with various network devices to receive communication traffic (i.e., payload traffic and OAM traffic). Typically, each network element 30 includes a number of shelf cards having various functionalities as described in more detail below. Communications traffic that is introduced to the communications network 20 is received by one of the network elements 30, transmitted along one or more communications paths, and delivered to a destination by another of the network element 30.

FIG. 1 illustrates a telecommunications network 10 in which the invention can be practiced. The telecommunications network 10 includes a communications network 20 having a number of network elements 30 (only three shown for clarity), communication paths, and other network components (not shown). As shown, the network elements 30 can communicate with various network devices to receive communication traffic (i.e., payload traffic and OAM traffic). Typically, each network element 30 includes a number of shelf cards having various functionalities as described in more detail below. Communications traffic that is introduced to the communications network 20 is received by one of the network elements 30, transmitted along one or more communications paths, and delivered to a destination by another of the network elements 30.

Figure 2:
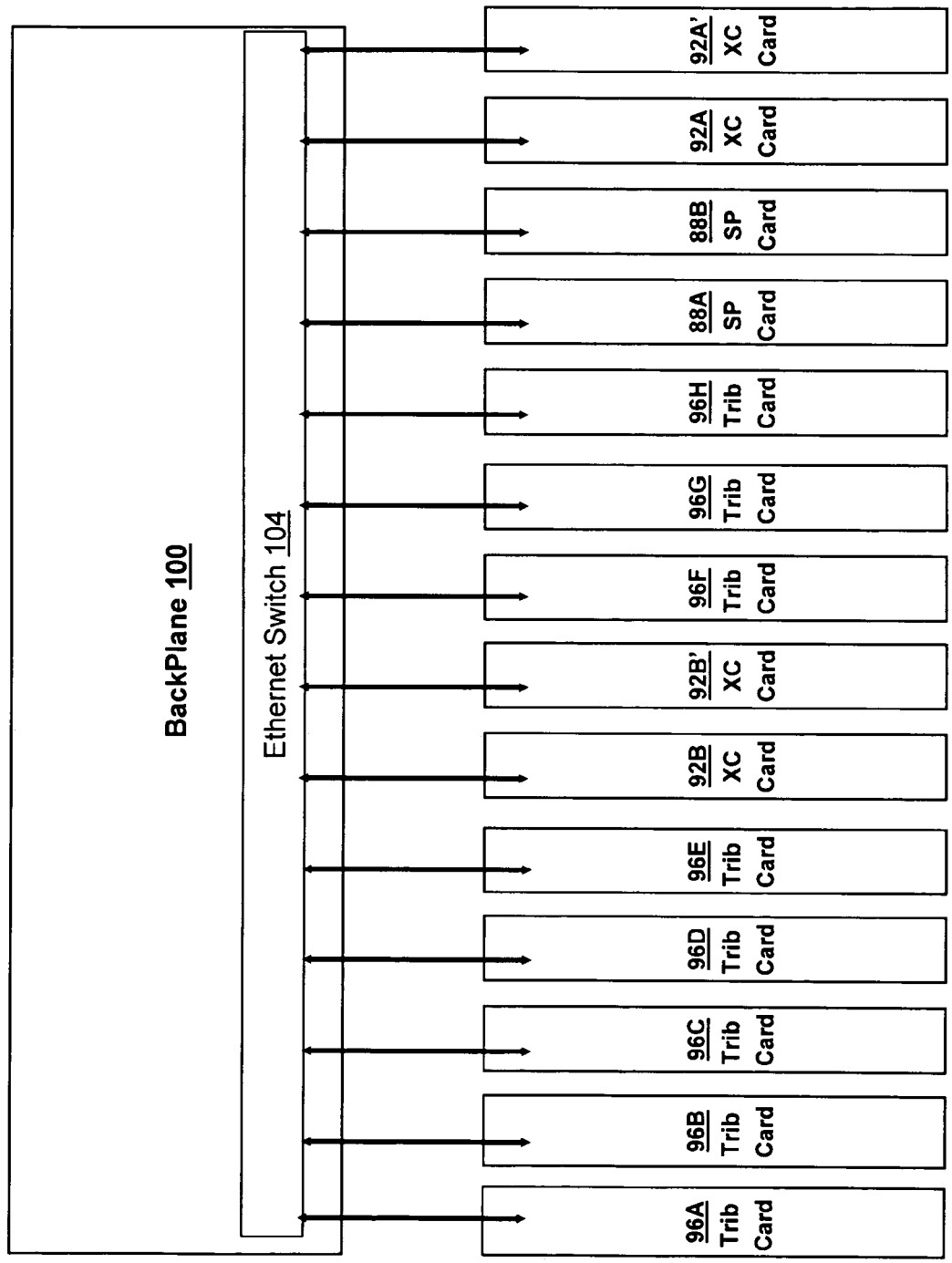
FIG. 2 is a block diagram of a network element in which principles of the invention may be practiced.

FIG. 2 is a block diagram of an embodiment of the network element 30 of FIG. 1. Each network element 30 includes a master shelf processor card 88A and a redundant shelf processor card 88B (referred to generally as shelf processor card 88), a pair of cross-connect cards 92A, 92B each having a respective redundant cross-connect card 92A', 92B' (referred to generally as cross-connect card 92), a plurality of tributary (or port) cards 96A, 96B, 96C, 96D, 96E, 96F, 96G, and 96H (referred to generally as tributary card 96), and a backplane 100, which includes an Ethernet switch 104. The shelf processor cards 88, cross-connect cards 92A, 92B, and tributary cards 96 are in communication with each other through the backplane 100.

The tributary cards 96 generally receive data signals and produce synchronous transport signals therefrom. Different types of tributary cards 96, for handling different signal formats and different signal rates, can reside within the network element 30. For example, signal formats that can be supported include, but are not limited to, DS1, DS3, E1, E3, Ethernet, OC-3, OC-12, OC-48, and OC-192 (also referred to as high-speed tributary cards). Tributary cards 96 supporting electrical signals (e.g., DS1, DS3) are generally referred to as copper tributary cards; those supporting optical signals, as optical tributary cards. For optical tributary cards, incoming and outgoing optical signals enter and exit the tributary card through ports of the card, as described in more detail below. Embodiments of tributary cards 96 have from one port (e.g., an OC-192 port) to 32 ports. For copper tributary cards, incoming and outgoing electrical signals pass through an input/output interface card (not shown) before passing to or coming from the tributary card 96 by way of the backplane 100.

The Ethernet switch 104 facilitates communication among the cards of the network element 30 and provides an Ethernet medium for exchanging information between the cards connected to the backplane 100. In one embodiment, the Ethernet switch supports data rates of up to 100 megabits per second. In addition, the backplane 100 provides a means for the master shelf processor card 88A to distribute the subsets of OAM routing information to the other cards 92, 96 of the network element 30. Software messaging techniques are used to transmit and receive communications through the backplane 100. Using an Ethernet switch allows routing of the OAM traffic to the respective tributary cards separately from the payload traffic, which is generally transmitted through 2.5 gigabit per second channels from the tributary cards 96 to the cross-connect cards 92.

From an operations perspective, the master shelf processor card 88A is the controller of the network element 30. The master shelf processor card 88A, in general, is configured to control the tributary cards 96 and cross-connect cards 92 for provisioning purposes and to determine the routes taken by the payload traffic and, potentially, by portions of the OAM traffic between tributary cards 96. Functionality for generating, storing, and maintaining a master OAM routing information set 124 is included within the master shelf processor card 88A. Additionally, the master shelf processor card 88A prepares subsets of the OAM routing information that are forwarded to the respective tributary cards 96 in accordance with principles of the invention. Capabilities for collecting alarms from the tributary cards 96, determining which alarms are relevant, and forwarding relevant alarms up to the OAM network 50 are also included within master shelf processor card 88A.

During general operation of the network element 30, the tributary card 96A (for example) receives incoming OAM signals, e.g., through a user-network interface or through a network-network interface. The tributary card 96A maps the OAM signal to a destination and sends the OAM signal to the cross-connect card 92A over the backplane 100. The cross-connect card 92A switches the OAM signal to another tributary card 96 in the network element 30. For example, the cross-connect card 92A can forward the OAM signal to the tributary card 96D. During this operation, the cross-connect cards 92A, 92B provide equipment redundancy. The cross-connect cards 92A, 92B operate without regard to the type of tributary cards 96 (i.e., DS1, DS3, OC-48) between which the OAM signal is being switched.

Figure 3:
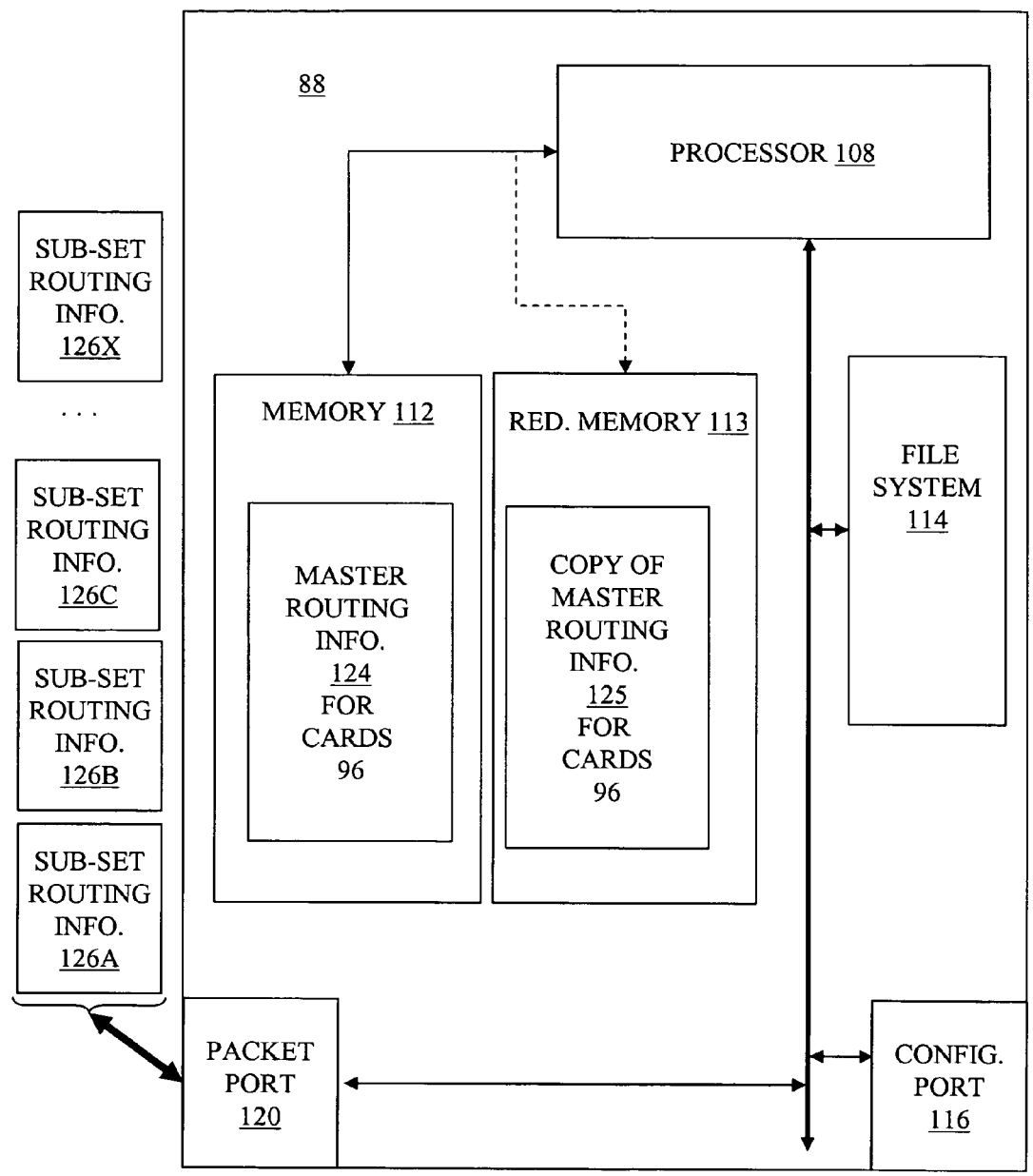
FIG. 3 is a block diagram of an embodiment of a shelf processor card of FIG. 2.

FIG. 3 depicts an embodiment of the master shelf processor card 88A in which principles of the invention may be practiced. The master shelf processor card 88A includes a processor 108, a primary memory element 112, a redundant memory element 113 (both of which are also referred to as memory banks), a file system 114, a configuration port 116, and a packet port 120. The processor 108 is in communication with the memory elements 112, redundant memory element 113, and the file system 114 through various signal paths within the master shelf processor card 88A.

The primary memory element 112 stores a master OAM routing information set 124, which can include items such as routing tables and databases, that is accessible by the processor 108. As used herein, the master OAM routing information set 124 refers to the OAM routing information for each card of the network element 30; that is, the OAM master routing information provides a complete view of the OAM routing paths for the network element 30. The redundant memory element 113 contains a copy 125 of the master OAM routing information 124 to provide redundancy within the master shelf processor card 88A should the primary memory element 112 fail or fault.

The redundant shelf processor card 88B (FIG. 2) includes elements and features similar to the master shelf processor card 88A. The redundant shelf processor card 88B provides redundant functionality of the master shelf processor card 88A within the network element 30 in the event the master shelf processor card 88A experiences a fault or failure. The network element 30 transfers processing responsibility to the redundant shelf processor card 88B if needed to keep the network element 30 operational until the master shelf processor card 88A can be replaced.

The configuration port 116 can accept a connection from the remote element 40 (e.g., a computer system). In one embodiment, the configuration port 116 is an RS 232 port. Changes to the master OAM routing information set 124 can be made by the remote element 40 (FIG. 1) by establishing a communications link with the network element through the configuration port 116. Changes to the master OAM routing information set 124 can also be made directly by the master shelf processor card 88A as other cards 92, 96 are added to and removed from the network element 30. The subsets 126A, 126B, 126C, . . . , 126X (referred to generally as subset 126) of the master OAM routing information set 124 are communicated to the tributary cards 96 via the backplane 100 and the packet port 120. Any OAM traffic that is received and processed by the master shelf processor card 88A is also forwarded to the other cards 92, 96 of the network element 30 through the packet port 120.

During operation, the master shelf processor card 88A uses a combination of provisioning information (i.e., which ports of the tributary cards 96 are participating in network communication) and traditional learning of neighbors methods to generate and maintain the master OAM routing information set 124.

Additionally the master shelf processor card 88A generates a respective subset 126 of OAM routing information for use by each of the tributary card 96 from the master routing information set 124. As used herein, a subset of the master OAM routing information is the routing information received from the master shelf processor card 88A that is used by the tributary card 96 to perform the described OAM routing functionality. For example, if tributary card 96A is in communication with tributary card 96D the subset 126 stored on the tributary card 96A includes addressing information for routing OAM traffic to the other tributary card 96D. The subset 126 provides the necessary addressing information to allow tributary card 96A to route the OAM traffic destined for tributary card 96D directly through the Ethernet switch 104 to the tributary card 96D. In various embodiments, the subsets 126 can include all or less than all of the master OAM routing information set 124.

Figure 4:
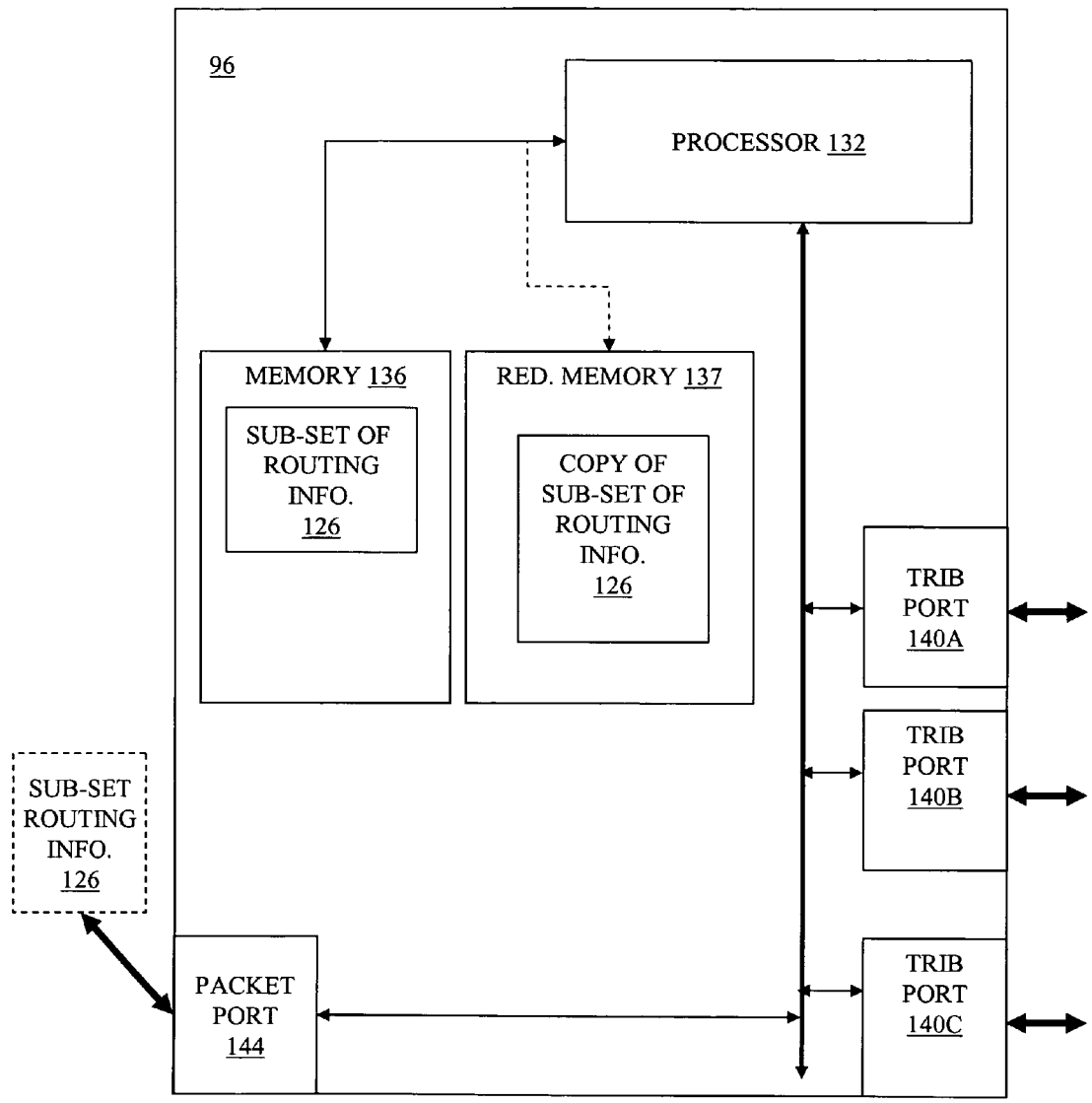
FIG. 4 is a block diagram of an embodiment of a tributary card of FIG. 2.

FIG. 4 shows an embodiment of a tributary card 96 of FIG. 2 in which principles of the invention can be practiced. The tributary card 96 includes a processor 132, a primary memory element 136, a redundant memory element 137, a plurality of tributary ports 140A, 140B, 140C (referred to generally as tributary port 140), and a packet port 144. The processor 132 is in communication with the primary memory element 136 and the redundant memory element 137 through various communication paths within the tributary card. The network element 30 receives OAM traffic and payload traffic through the tributary ports 140. The subset 126 of the master OAM routing information for this particular tributary card 96 is received from the master shelf processor card 88A through the packet port 144.

The primary memory element 136 is configured to store the subset 126 of the master OAM routing information set 124. The redundant memory element 137 contains a copy 127 of the subset 126 to provide redundancy within the tributary card 96 should the primary memory element 136 fault or fail. The processor 132 is programmed to examine incoming OAM traffic received by the tributary card 96 and access the subset 126 stored in primary memory element 136 to determine if the OAM traffic can be routed by the tributary card 96 instead of transferring the OAM traffic to the master shelf processor card 88A.

To illustrate the general operation of the tributary card 96A, it is assumed that that tributary cards 96A, and 96D are in communication with each other. After receiving OAM traffic, the tributary card 96A examines the received OAM traffic to determine if the destination address is that of tributary card 96D. In one embodiment, the processor 132 examines the overhead bytes of the OAM traffic. Specifically, the processor examines either bytes D1-D3, which indicate a data channel, or bytes D4-D12, which indicate a line channel. If the overhead bytes of the OAM traffic indicate that the OAM traffic is destined for tributary card 96D, then tributary card 96A encapsulates the OAM traffic with the destination address of tributary card 96D and transmits the OAM traffic across the backplane 100. At tributary card 96D, the encapsulated address is removed and the OAM traffic is placed in the outgoing data stream of the tributary card 96D.

However, if the overhead bytes of the OAM traffic indicate that the OAM traffic is destined for a tributary card 96 other than the tributary card 96D (e.g., tributary card 96G), the tributary card 96A encapsulates the OAM traffic with the address of the master shelf processor card 88A and transmits the OAM traffic to the master shelf processor card 88A through the backplane. In response, the master shelf processor card 88A removes the encapsulated address and subsequently encapsulates the OAM traffic with the address of the other tributary card 96 and transmits the OAM traffic to the other tributary card 96 through the backplane 100. At other tributary card 96, the encapsulated address is removed and the OAM traffic is placed in the outgoing data stream of the other tributary card 96.

Figure 5:
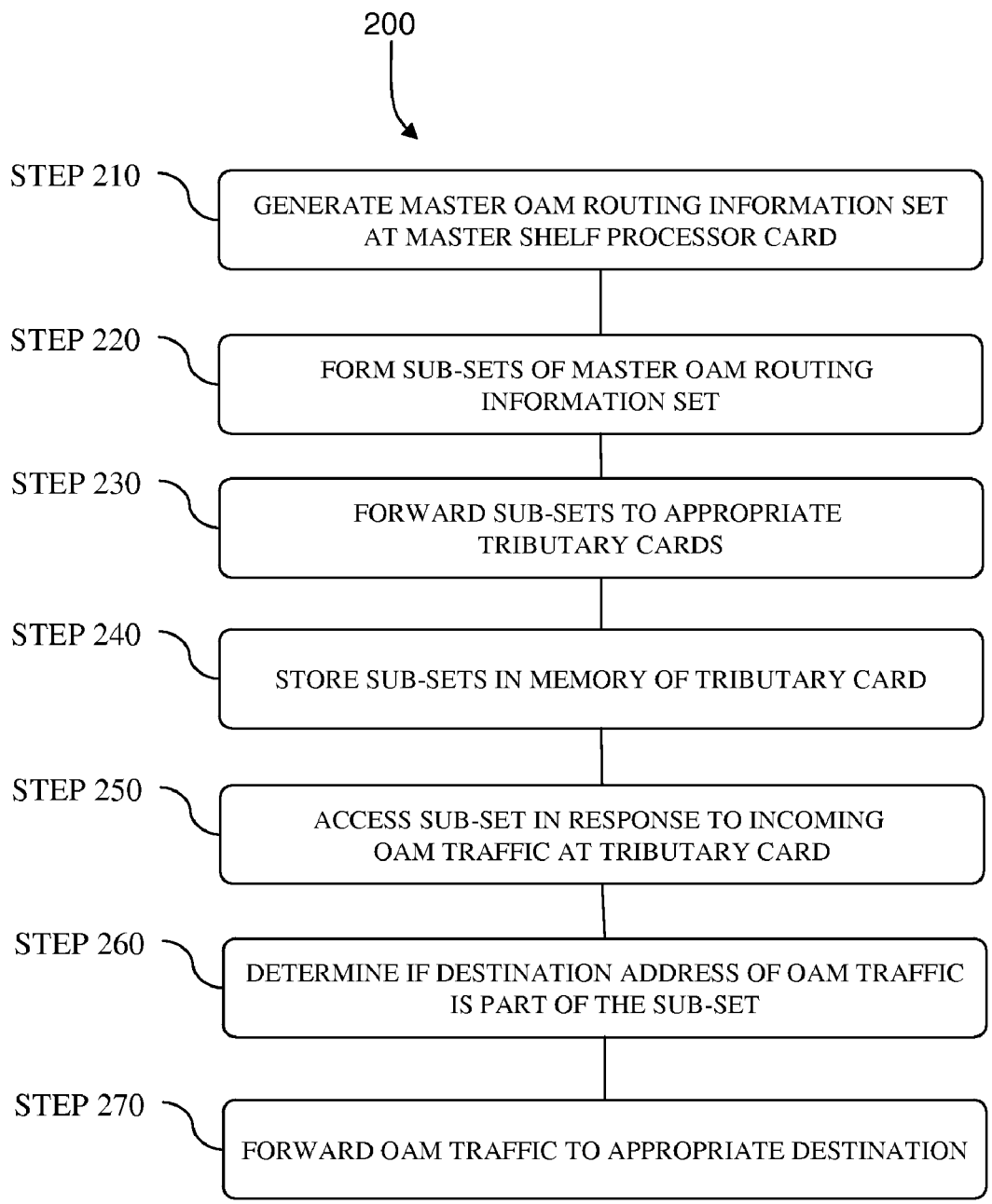
FIG. 5 is a flow chart of an embodiment of a method for routing OAM traffic according to principles of the invention.

FIG. 5 is a flow chart depicting an embodiment of a method 200 of routing OAM traffic within an optical network according to principles of the invention. As a general overview, each of the tributary cards 96 includes a respective subset 126 of the master OAM routing information set 124 of the master shelf processor card 88A and uses the subset 126 to route OAM traffic having a destination address that is found in the subset 126 of the master OAM routing information.

The master shelf processor card 88A generates (step 210) the master OAM routing information set 124 using the methods described above. The primary memory element 112 of the master shelf processor card 88A stores the master OAM routing information set 124. In the event that the master processor card 88 is called upon to route OAM traffic received by the network element 30, the master processor card 88 accesses the master OAM routing information set 124 and routes the OAM traffic accordingly. However, to reduce the processing load of the master shelf processor card 88A, the master shelf processor card 88A forms (step 220) the subset 126 of the master OAM routing information for a number of the tributary cards 96 of the network element 30 and forwards (step 230) the subsets 126 to the appropriate tributary cards 96 through the backplane 100.

Each of the tributary cards 96 receives and stores (step 240), in the memory elements 136, 137 of the tributary cards 96, a respective subset 126 received from the master shelf processor card 88A. When the tributary card 96 receives OAM traffic at a tributary port 140, the processor 132 of the tributary card 96 accesses the subset 126 and determines (step 260) if the destination address of the OAM traffic is present in the subset 126 of the master OAM routing information. If the destination address of the OAM traffic is present in the subset 126 of the master OAM routing information, then the tributary cards forwards the OAM traffic to the destination address using the backplane 100. If the destination address of the OAM traffic is not found in the subset 126 of the master OAM routing information, the OAM traffic is forwarded to the master shelf processor card 88A for routing to the intended destination address.

The invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A network element for use in an optical communications system, comprising:
   a backplane;
   a plurality of cards in communication with the backplane, a first card of the plurality of cards having a processor element for executing instructions and a memory element for storing routing information, the first card distributing subsets of the routing information to other cards of the plurality of cards, a second card of the plurality of cards having a memory element for storing a subset of the routing information distributed by the first card and a processor element for executing instructions, the processor element of the second card accessing the memory element of the second card in response to the second card receiving a packet over a network, the second card determining a destination address from information carried by the packet, the destination address corresponding to a third card of the plurality of cards in the network element,
   wherein the second card routes the packet to the third card if the destination address is in the subset of the routing information, but if the subset of routing information lacks the destination address, the second card routes the packet to the first card and the first card routes the packet to the third card.

2. The network element of claim 1 further comprising a 100baseT communications link connecting each of the first card and the second card to the backplane.

3. The network element of claim 1 wherein the routing information comprises provisioning data.

4. The network element of claim 1 wherein the subset of the routing information comprises provisioning data related to a port of the second card.

5. The network element of claim 1, wherein the packet is part of OAM traffic.

6. The network element of claim 5, wherein the backplane includes an Ethernet switch in communication with each card, the Ethernet switch routing OAM traffic between cards separately from payload traffic.

7. A network element for use in an optical communications system, comprising:
   a backplane;
   a plurality of cards in communication with the backplane, each card having a processor element for executing instructions and a memory element for storing OAM (Operations, Administration, and Management) routing information, a first card of the plurality of cards storing OAM routing information for each of the other cards and transmitting to a second card and a third card of the plurality of cards a portion of the OAM routing information relevant to that card, the second card receiving OAM traffic over a network and determining a destination address from information carried by the OAM traffic, the destination address corresponding to the third card, wherein the second card routes the OAM traffic to the third card if the portion of OAM routing information transmitted to the second card includes the destination address of the third card, but if the portion of OAM routing information transmitted to the second card lacks the destination address of the third card, the second card routes the OAM traffic to the first card and the first card routes the OAM traffic to the third card.

8. The network element of claim 7 further comprising a 100baseT communications link connecting each one of the plurality of cards to the backplane.

9. The network element of claim 8 wherein the OAM routing information comprises provisioning data.

10. The network element of claim 7, wherein the packet is part of OAM traffic.

11. The network element of claim 10, wherein the backplane includes an Ethernet switch in communication with each card, the Ethernet switch routing OAM traffic between cards separately from payload traffic.

12. A method for routing a management packet in an optical communications system, comprising:
   generating an OAM (Operations, Administration, and Management) routing information set for use in a first card of an network element;
   forming a subset of the OAM routing information set;
   forwarding the subset through a backplane from the first card to a second card of the network element;
   storing the subset of the OAM routing information set in a memory element of the second card;
   accessing the subset of the OAM routing information set in response to receiving a packet;
   determining a destination address from information carried by the packet, the destination address corresponding to a third card in the network element; and
   routing, by the second card, the packet to the third card if the destination address is in the subset of the OAM routing information set, but if the subset of the OAM routing information set lacks the destination address, routing, by the second card, the packet to the first card and routing, by the first card, the packet to the third card.

13. The method of claim 12 further comprising storing the OAM routing information set in a memory element of the first card.

14. The method of claim 12 further comprising updating the OAM routing information set in response to a change in the network element.

15. The method of claim 14 further comprising updating the subset and forwarding the updated subset to the second card.

16. The method of claim 12 wherein the generating comprises receiving provisioning information by the first card.

17. The method of claim 12 wherein the OAM routing information set comprises provisioning information.

18. The method of claim 17 wherein the subset comprises provisioning data related to a port of the second card.

19. The method of claim 12, wherein the step of determining includes extracting from the packet overhead bytes used to identify a communication channel.

20. The method of claim 19, wherein the overhead bytes are D4-D12 bytes of an optical signal.

* * * * *

UNITED STATES PATENT AND TRADEMARK OFFICE
CERTIFICATE OF CORRECTION

PATENT NO. : 7,590,136 B1  
APPLICATION NO. : 10/962044  
DATED : September 15, 2009  
INVENTOR(S) : Palker et al.

Page 1 of 1

It is certified that error appears in the above-identified patent and that said Letters Patent is hereby corrected as shown below:

In column 2, delete the entire paragraph that starts at line 43 and ends at line 57.

In column 3, insert the following paragraph between lines 5 and 6:

--The network elements 30 and their resources are managed by a remote device 40 (e.g., a computer system) through an OAM network 50 that is typically independent of the communications network 20. Management includes issuing commands, such as TL1 (Transaction Language 1) commands, from the remote device 40 to the network elements 30. Each network element 30 includes one or more ports for coupling to the OAM network 50. OAM traffic is introduced to the OAM network 50 through one of the network elements 30 or through the remote device 40. The OAM traffic is routed to the appropriate destination through the communications links and the other network elements 30 using the distributed routing method as described in more detail below.--

Signed and Sealed this  
Twenty-eighth Day of December, 2010

David J. Kappos  
*Director of the United States Patent and Trademark Office*